US011933757B2

(12) United States Patent
Kawamoto et al.

(10) Patent No.: US 11,933,757 B2
(45) Date of Patent: Mar. 19, 2024

(54) GAS SENSOR

(71) Applicant: DENSO CORPORATION, Kariya (JP)

(72) Inventors: Yuusuke Kawamoto, Kariya (JP); Yuusuke Toudou, Kariya (JP); Takashi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 337 days.

(21) Appl. No.: 15/521,967

(22) PCT Filed: Oct. 20, 2015

(86) PCT No.: PCT/JP2015/079585
§ 371 (c)(1),
(2) Date: Apr. 26, 2017

(87) PCT Pub. No.: WO2016/067975
PCT Pub. Date: May 6, 2016

(65) Prior Publication Data
US 2017/0315082 A1    Nov. 2, 2017

(30) Foreign Application Priority Data

Oct. 30, 2014 (JP) ................................. 2014-221354
Sep. 17, 2015 (JP) ................................. 2015-184367

(51) Int. Cl.
*G01N 27/41* (2006.01)
*G01N 27/406* (2006.01)
*G01N 27/407* (2006.01)

(52) U.S. Cl.
CPC ......... *G01N 27/41* (2013.01); *G01N 27/4067* (2013.01); *G01N 27/4077* (2013.01); *G01N 27/4078* (2013.01)

(58) Field of Classification Search
CPC .............. G01N 27/41; G01N 27/4067; G01N 27/4077; G01N 27/4078; G01N 27/406
See application file for complete search history.

(56) References Cited

U.S. PATENT DOCUMENTS 4,502,939 A      3/1985  Holfelder et al.
4,624,770 A  *  11/1986  Yamada ............. G01N 27/4077
                                                          204/425

(Continued)

FOREIGN PATENT DOCUMENTS

EP    2 375 247 A1    10/2011
JP    08-240557        9/1996
(Continued)

*Primary Examiner* — Joshua L Allen
*Assistant Examiner* — Vivian A Tran
(74) *Attorney, Agent, or Firm* — Nixon & Vanderhye P.C.

(57) ABSTRACT

A gas sensor is equipped with a housing, an insulator retained by an inner periphery of the housing, a sensing device having a front end portion protruding from a front end surface of the insulator, and a protective cover which covers a front end portion of the sensing device. A pump electrode and a sensor electrode are disposed in a front end portion of the solid electrolyte body. The pump electrode is exposed to a measurement gas and regulates the concentration of oxygen in the measurement gas. The sensor electrode is exposed to the measurement gas and measures the concentration of a given gas component in the measurement gas after being regulated in concentration of oxygen by the pump electrode. A base end portion of the sensor electrode in a lengthwise direction is located closer to a base end side of the gas sensor than a front end surface of the housing is. This minimizes a variation in temperature of the sensor electrode and enhances the accuracy in measuring the concentration of the given gas component.

7 Claims, 7 Drawing Sheets

(56) References Cited

U.S. PATENT DOCUMENTS

| | | | | |
|---|---|---|---|---|
| 5,676,811 A * | 10/1997 | Makino | | G01N 27/419 |
| | | | | 204/425 |
| 2004/0050695 A1 * | 3/2004 | Haraguchi | | G01N 27/419 |
| | | | | 204/424 |
| 2004/0159547 A1 * | 8/2004 | Haraguchi | | G01N 33/0037 |
| | | | | 204/424 |
| 2007/0193337 A1 * | 8/2007 | Kanao | | G01N 27/4077 |
| | | | | 73/31.05 |
| 2008/0142364 A1 * | 6/2008 | Naito | | G01N 27/4077 |
| | | | | 204/427 |
| 2008/0156644 A1 * | 7/2008 | Suzuki | | G01N 33/0037 |
| | | | | 204/294 |
| 2008/0209984 A1 * | 9/2008 | Yamada | | G01N 27/4077 |
| | | | | 73/31.05 |
| 2009/0250344 A1 * | 10/2009 | Ohya | | G01N 27/4067 |
| | | | | 204/425 |
| 2011/0226618 A1 * | 9/2011 | Fujita | | G01N 27/4072 |
| | | | | 204/412 |
| 2011/0233060 A1 † | 9/2011 | Horisaka | | |
| 2011/0283774 A1 | 11/2011 | Sekiya et al. | | |
| 2013/0092537 A1 * | 4/2013 | Mizutani | | G01N 27/419 |
| | | | | 204/427 |
| 2014/0305188 A1 * | 10/2014 | Kume | | G01N 27/4077 |
| | | | | 73/23.2 |
| 2015/0276659 A1 * | 10/2015 | Sekiya | | G01N 27/417 |
| | | | | 204/416 |
| 2016/0076919 A1 * | 3/2016 | Murakami | | G01D 11/245 |
| | | | | 73/431 |
| 2016/0209354 A1 * | 7/2016 | Araki | | G01N 27/419 |
| 2017/0122897 A1 * | 5/2017 | Kawamoto | | G01N 27/4067 |
| 2018/0180570 A1 * | 6/2018 | Hino | | G01N 27/4078 |

FOREIGN PATENT DOCUMENTS

| | | |
|---|---|---|
| JP | 2008-281583 | 11/2008 |
| JP | 2010-127938 | 6/2010 |
| JP | 2011-058834 | 3/2011 |

\* cited by examiner
† cited by third party

GAS SENSOR

This application is the U.S. national phase of International Application No. PCT/JP2015/079585 filed Oct. 20, 2015 which designated the U.S. and claims priority to JP Patent Application No. 2014-221354 filed Oct. 30, 2014, and JP Patent Application No. 2015-184367 filed Sep. 17, 2015, the entire contents of each of which are hereby incorporated by reference.

TECHNICAL FIELD

The present invention generally relates to a gas sensor designed to measure a given gas component contained in a measurement gas.

BACKGROUND ART

Typical gas sensors which measures the concentration of a given gas component, such as NOx, contained in a measurement gas, such as exhaust gas emitted from an internal combustion engine work to regulate the concentration of oxygen in the measurement gas using a pump cell and then measure, using a sensor cell, the concentration of the given gas component in the measurement gas whose concentration of oxygen has already been regulated.

An electrode constituting the pump cell and an electrode constituting a sensor cell need to be operated in a suitable temperature range. Specifically, the electrode constituting the pump cell is operated in a temperature range in which it decomposes oxygen, but does not decompose the given gas component. The electrode constituting the sensor cell is operated in a temperature range in which it decomposes the given gas component, but does not decompose water.

For instance, Japanese Patent First Publication No. 2008-281583 discloses a gas sensor equipped with a sensing device which measures a given gas component contained in a measurement gas and inner and outer protective covers which cover a front end portion of the sensing device. The gas sensor is designed to have a relation between a total opening area A1 of inner gas inlet holes of the inner protective cover and a total opening area A2 of an outer gas inlet holes of the outer protective cover which meets a relation of A1/A2≥1, thereby decreasing the flow velocity of the measuring gas which has been delivered from the outer gas inlet holes into the outer protective cover passes through the inner gas inlet holes. In other words, a ratio of the total opening areas of all the gas inlet holes is regulated to minimize a variation in temperature of the sensing device which arises from entrance of the measurement gas into the protective covers.

SUMMARY OF THE INVENTION

Problem to be Solved by the Invention

The above conventional gas sensor has a gas measuring portion of the sensing device in which the pump electrode and the sensor electrode are disposed. The whole of the gas measuring portion protrudes from a front end surface of a housing toward a front end of the gas sensor. The gas sensor is shaped to facilitate the ease with which the measurement gas impacts a region including a portion of the sensing device in which the pump electrode and the sensor electrode are arranged.

The gas sensor also controls the temperature of the sensing device using the fact that the impedance of the pump cell changes as a function of temperature thereof. Specifically, the temperature of the pump electrode is controlled as a function of the impedance of the pump cell to indirectly control the temperature of the sensor cell. This facilitates the ease with which the temperature of the sensor electrode changes in a case where the gas sensor is designed so as to facilitate impact of the measurement gas easily around a portion of the sensing device in which the sensor electrode is disposed.

The invention was made in view of the above background to provide a gas sensor which minimizes a temperature variation of a sensor electrode to enhance the accuracy in measuring the concentration of a given gas component.

Means for Solving the Problem

One aspect of the invention is a gas sensor which comprises: a housing; an insulator retained by an inner periphery of the housing; a sensing device which includes a solid electrolyte body which is disposed in the insulator and has oxygen ion conductivity, a front end portion in the lengthwise direction of the gas sensor protruding from a front end surface of the insulator; and a protective cover which is secured to the front end portion of the housing so as to cover the front end portion of the sensing device and have formed therein a cover inlet hole which directs a measurement gas to the front end portion of the sensing device. A pump electrode and a sensor electrode are disposed in a front end portion of the solid electrolyte body in the lengthwise direction. The pump electrode is exposed to the measurement gas and regulates the concentration of oxygen in the measurement gas. The sensor electrode is exposed to the measurement gas and measures the concentration of a given gas component in the measurement gas after being regulated in concentration of oxygen by the pump electrode. A base end of the sensor electrode in the lengthwise direction is located closer to a base end side of the gas sensor than a front end surface of the housing is.

Beneficial Effects of the Invention

The above gas sensor is engineered to have a devised positional relation between the front end surface of the housing and the sensor electrode of the sensing device.

Specifically, the base end of the sensor electrode of the sensing device in the lengthwise direction is located closer to the base end side than the front end surface of the housing is. A portion of the sensing device in which the sensor electrode is disposed is at least partially disposed in the housing.

When the gas sensor measures the concentration of the given gas component in the measurement gas, the measurement gas is delivered into the protective cover through the cover inlet hole and then contacts the front end portion of the sensing device (i.e., the solid electrolyte body) in the lengthwise direction. The base end of the sensing device in the lengthwise direction is located closer to the base end than the front end surface of the housing is, thereby minimizing a probability that the measurement gas impacts a region including a portion of the sensing device in which the sensor electrode is disposed or decreasing the flow velocity of the measurement gas which impacts a region including the portion of the sensing device in which the sensor electrode is disposed. This decreases a variation in temperature of the sensor electrode in response to a change in temperature of the measurement gas.

Accordingly, the above gas sensor has a decreased variation in temperature of the sensor electrode and an enhanced accuracy in measuring the concentration of the given gas component.

EMBODIMENT FOR CARRYING OUT THE INVENTION

The gas sensor 1 according to this embodiment will be described below with reference to the drawings.

Figure 1:
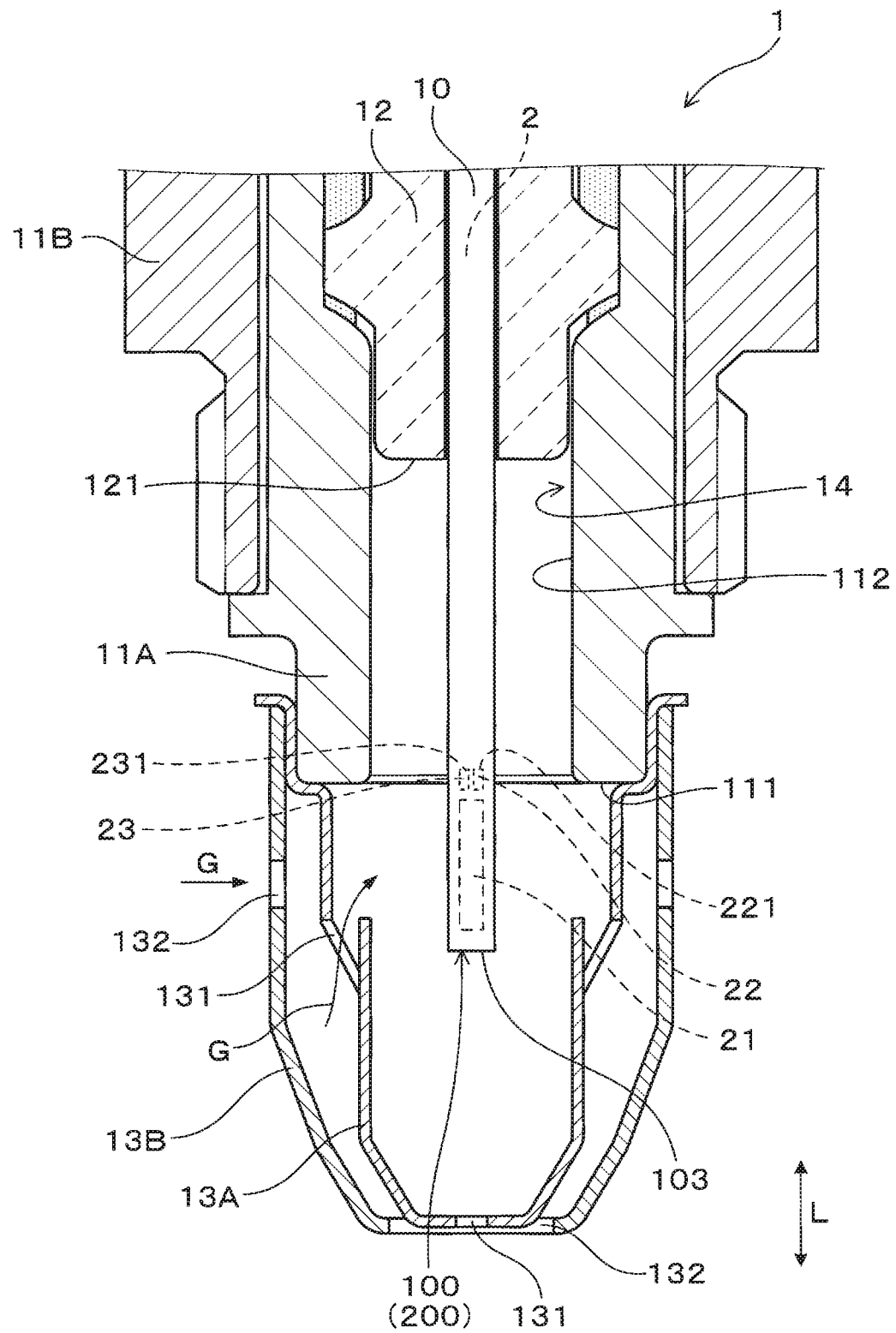
FIG. 1 is an explanatory sectional view which shows a front end portion of a gas sensor according to an embodiment.

The gas sensor 1, as illustrated in FIG. 1, includes the housing 11A and 11B, the insulator 12, the sensing device 10, and the protective covers 13A and 13B. The housing 11A and 11B are made of metal. The insulator 12 is made of insulating ceramics and retained inside an inner periphery of the housing 11A. The sensing device 10 is disposed in the insulator 12 and equipped with the solid electrolyte body 2 which has oxygen ion conductivity. The sensing device 10 has a given length and includes the front end portion 100. The front end portion 100 protrudes from the front end surface 121 of the insulator along a lengthwise direction L of the sensing device 10. The protective covers 13A and 13B are made of metal and secured to a front end (i.e., a lower end, as viewed in the drawing) of the housing 11A, so as to cover the front end portion 100 of the sensing device 10. The protective covers 13A and 13B has formed therein the cover inlet holes 131 and 132 which direct the measurement gas G to the front end portion 100 of the sensing device 10.

Figure 4:
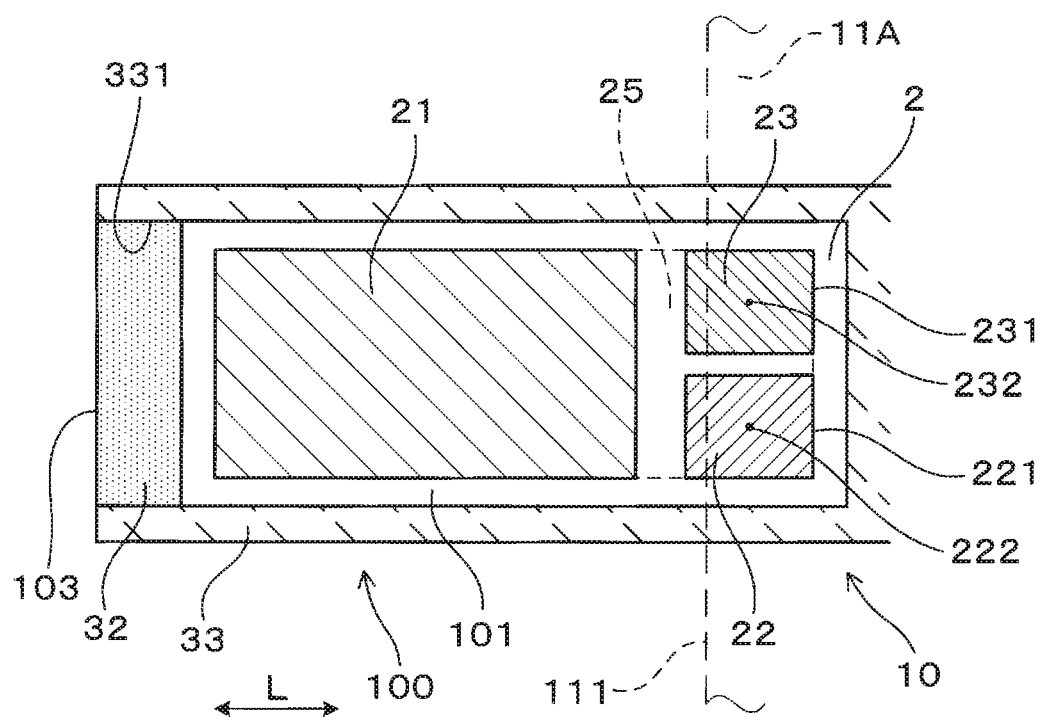
FIG. 4 is an explanatory plane view which illustrates configurations of a pump electrode and a sensor electrode of a sensing device according to an embodiment.

The solid electrolyte body 2 has the front end portion 200. The front end portion 200 has disposed thereon the pump electrode 21 and the sensor electrode 23. The pump electrode 21 is exposed to the measurement gas G to regulate the concentration of oxygen in the measurement gas G. The sensor electrode 23 is exposed to the measurement gas G to measure the concentration of the given gas component of the measurement gas G whose concentration of oxygen has been regulated by the pump electrode 21. The The sensor electrode 23, as illustrated in FIGS. 1 and 4, has the base end edge 231 which is closer to the base end of the gas sensor 1 (i.e., the sensing device 10) than the front end surface 111 of the housing 11A is in the lengthwise direction L of the sensing device 10.

Figure 2:
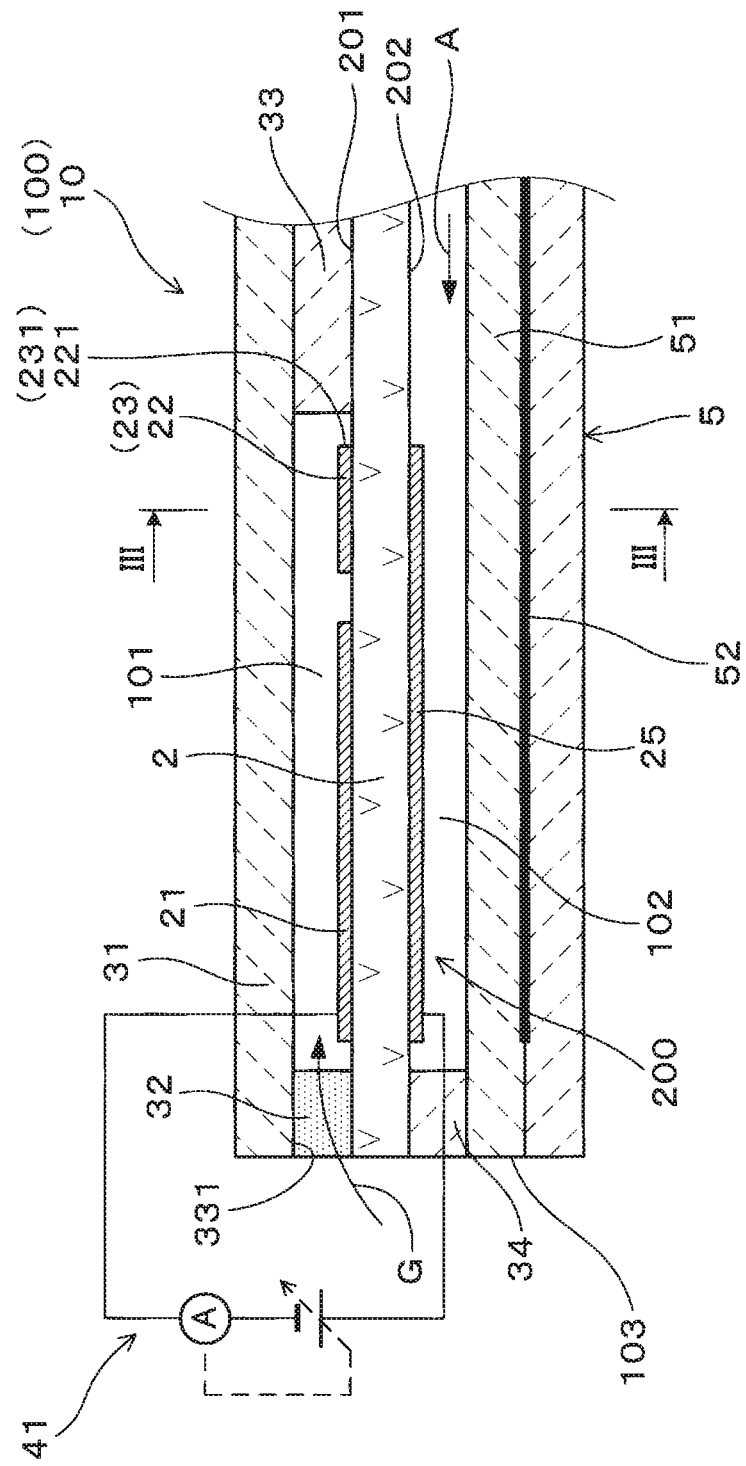
FIG. 2 is an explanatory sectional view which illustrates a sensing device according to an embodiment.
Figure 3:
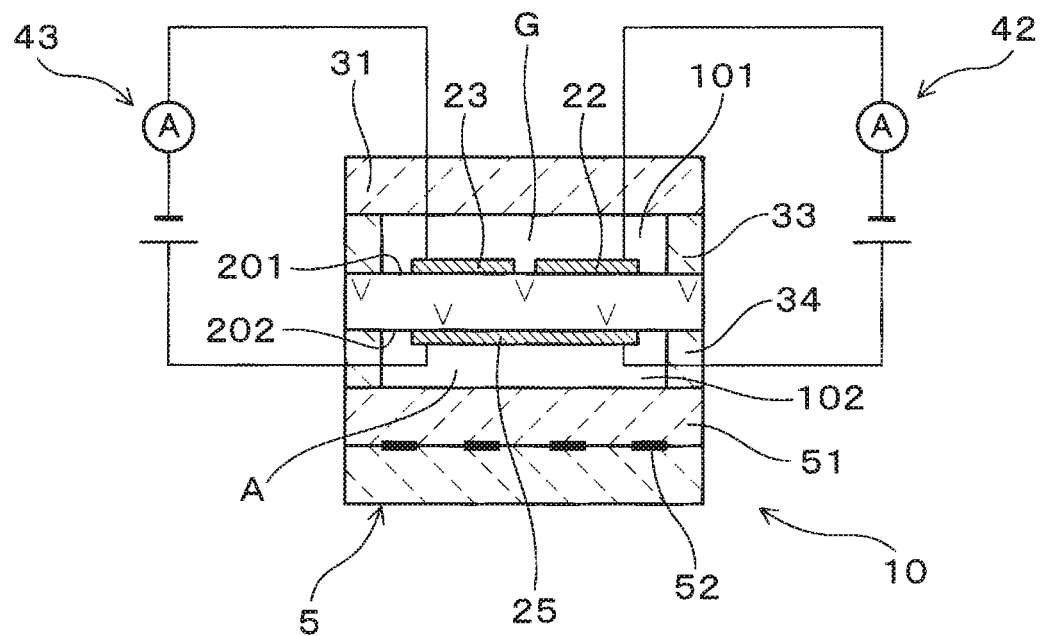
FIG. 3 is a view which illustrates a sensing device according to an embodiment and an explanatory sectional view, as taken along the line III-III in FIG. 2.

In this disclosure, a portion of the sensing device 10 protruding from the insulator 12 will be referred to as a front end side. In FIG. 1, a lower side is the front end side, while an upper side is the base end side. FIGS. 2 to 4 schematically illustrate the sensing device 10 and show the pump electrode 21 and the sensor electrode 23 as being shorter than in reality.

The gas sensor 1 will be explained below in detail with reference to FIGS. 1 to 7.

The gas sensor 1 is used to concentration of NOx that is the given gas component contained in the measurement gas G that is exhaust gas flowing through an exhaust pipe of an internal combustion engine. The sensing device 10 is, as illustrated in FIG. 2, made of a stack of the insulator 31 and the heater 5. The insulator 31 defines the measurement gas space 101 between itself and the solid electrolyte body 2. The heater 4 works to heat the solid electrolyte body 2. The solid electrolyte body 2 has surfaces 201 and 202 which are opposed to each other in a thickness-wise direction of the solid electrolyte body 2. The insulator 31 is disposed on the surface 201 through the spacer 33. The sensing device 10 has the measurement gas space 101 surrounded by the surface 201 of the solid electrolyte body 2, the insulator 31, and the spacer 33 and in to which the measurement gas G is delivered.

The front end 103 of the sensing device 10 has, as illustrated in FIG. 2, formed therein the inlet hole 331 through which the measurement gas G is admitted into the measurement gas space 101 through the diffusion resistor 32. The inlet hole 331 is formed in a front end portion of the spacer 33. The diffusion resistor 32 is made of a porous material which provides a given degree of diffusion resistance to a flow of the measurement gas G. The diffusion resistor 32 is disposed in the inlet hole 331. The pump electrode 21 and the sensor electrode 23 are mounted on the surface 201 of the solid electrolyte body 2 and exposed to the measurement gas G flowing into the measurement gas space 101.

On the surface 201 of the solid electrolyte body 2, as illustrated in FIGS. 3 and 4, the monitor electrode 22 is arranged adjacent the sensor electrode 23. The monitor electrode 22 is exposed to the measurement gas G and works to measure the concentration of oxygen in the measurement gas G whose concentration of oxygen has already been regulated by the pump electrode 21.

The pump electrode 21 is disposed on the front end of the solid electrolyte body 2 of the sensing device 10 which is close to the inlet hole 331. The sensor electrode 23 and the monitor electrode 22 are arranged adjacent the base end side of the pump electrode 21 at the same distance from the pump electrode 21. In other words, the sensor electrode 23 and the monitor electrode 22 are located at equal intervals away from a base end edge of the pump electrode 21 in the lengthwise direction L.

The heater 5 is, as illustrated in FIGS. 2 and 3, disposed on the surface 202 of the solid electrolyte body 2 through the spacer 34. The heater 5 is made up of a pair of ceramic substrates 51 and a heating layer 52 interposed between the ceramic substrates 51. The sensing device 10 has the reference gas space 102 which is surrounded by the surface 202 of the solid electrolyte body 2, the heater 5, and the spacer 34 and into which a reference gas (i.e., atmospheric gas) A is introduced. The reference electrode 25 which is exposed to the reference gas A, as having entered the reference gas space 102, is disposed on an area of the surface 202 on to which the pump electrode 21, the monitor electrode 22, and the sensor electrode 23 are projected in the thickness-wise direction of the solid electrolyte body 2, that is, the reference electrode 25 faces the pump electrode 21, the monitor electrode 22, and the sensor electrode 23 through the solid electrolyte body 2.

The reference electrode 25 occupies the whole of the area of the surface 202 onto which three electrodes: the pump electrode 21, the monitor electrode 22, and the sensor electrode 23 are projected. The reference electrodes 25 may alternatively be provided one for each of the pump electrode 21, the monitor electrode 22, and the sensor electrode 23.

The sensing device 10, as illustrated in FIGS. 2 and 3, has the pump cell 41 which applies voltage between the pump electrode 21 and the reference electrode 25 through the solid electrolyte body 2 to adjust the concentration of oxygen in the measurement gas G in the measurement gas space 101 to below a given concentration. The sensing device 10 also has the monitor cell 42 which measures an oxygen ion current flowing between the monitor electrode 22 and the reference electrode 25 through the solid electrolyte body 2 to determine the concentration of oxygen contained in the measurement gas G in the measurement gas space 101 which has been already regulated in oxygen concentration thereby by the pump cell 41. The sensing device 10 also has the sensor cell 43 which measures an oxygen ion current flowing between the sensor electrode 23 and the reference electrode 25 through the solid electrolyte body 2 to determine concentrations of NOx and oxygen contained in the measurement gas G in the measurement gas space 101 which has been already regulated in oxygen concentration thereby by the pump cell 41. The gas sensor 1 subtracts a value of the oxygen ion current in the monitor cell 42 from a value of the oxygen ion current in the sensor cell 43 to determine the concentration of NOx in the measurement gas G.

The housing 11A and 11B are, as can be seen in FIG. 1, the first housing 11A which is located on an outer periphery of the insulator 12 and a second housing 11B which is arranged on an outer periphery of the first housing 11A. The first housing 11A has a front end portion which protrudes from the front end of the second housing 11B toward the front end side of the gas sensor 1.

An assembly of the protective covers 13A and 13B has a double-wall structure. The protective covers 13A and 13B are the first protective cover 13A which is secured to the outer periphery of the front end portion of the first housing 11A and the second protective cover 13B which is affixed to the outer periphery of the first protective cover 13A, respectively. The cover inlet holes 131 and 132 which direct the measurement gas G to the front end portion 100 of the sensing device 10 are the cover inlet holes 131 formed in an outer periphery and a front end of the first protective cover 13A and the cover inlet holes 132 formed in an outer periphery and a front end of the second protective cover 13B, respectively. The measurement gas G first passes the outer periphery of the first protective cover 13A and the outer periphery of the second protective cover 13B, flows into the second protective cover 13B, contacts the front end portion 100 of the sensing device 10, passes the front end of the first protective cover 13A and the front end of the second protective cover 13B, and then goes outside the protective covers 13A and 13B.

The front end of the first protective cover 13A is, as illustrated in FIG. 1, located inside the cover inlet hole 132 formed in the front end of the second protective cover 13B. The measurement gas G, as having passed through the cover inlet holes 131 in the outer periphery of the first protective cover 13A and flows to the base end side, contacts the front end portion 100 of the sensing device 10 disposed in the first protective cover 13A.

Figure 7:
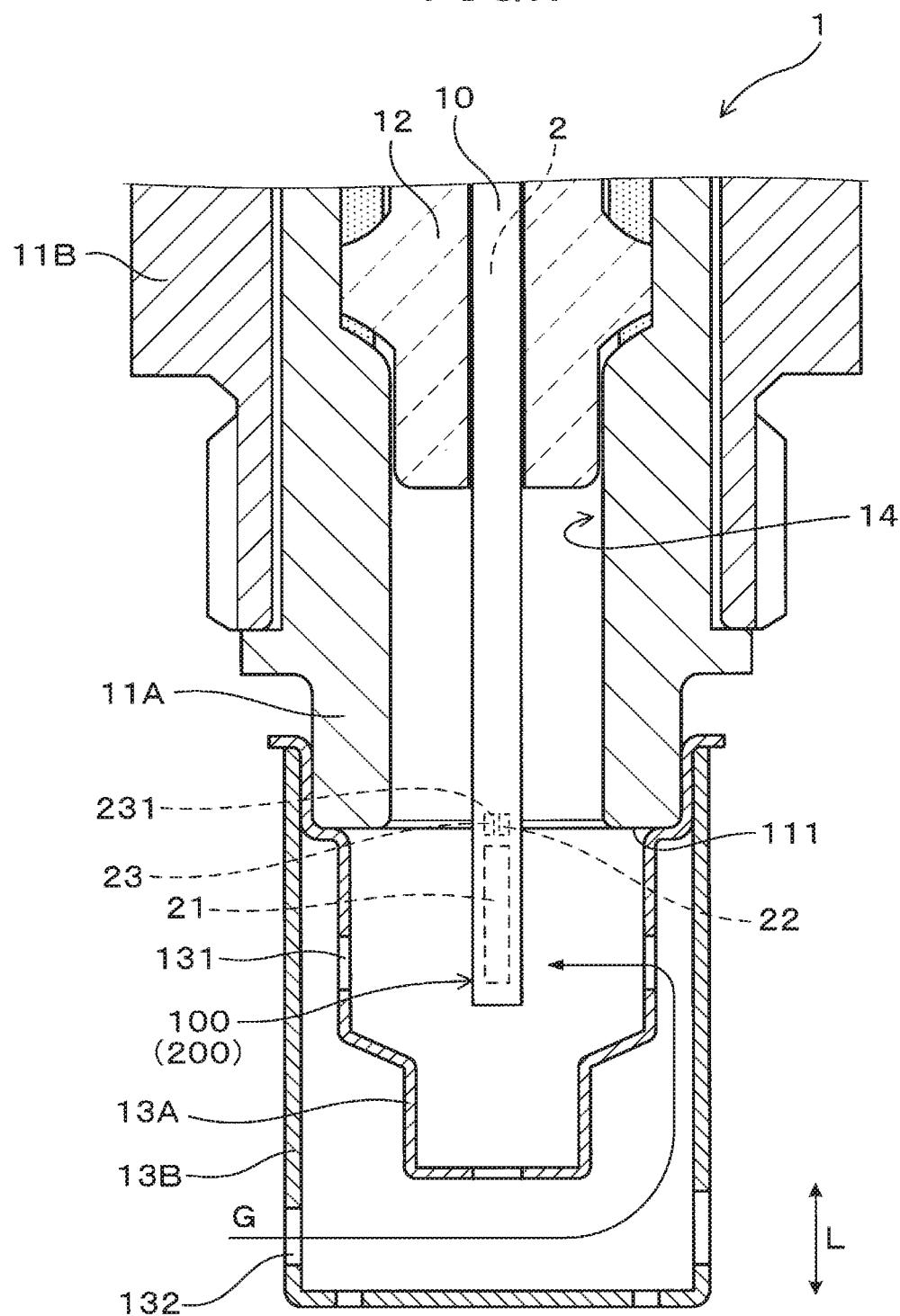
FIG. 7 is an explanatory sectional view which illustrates a front end portion of another type of a gas sensor according to an embodiment.

The front end of the first protective cover 13A may, as illustrated in FIG. 7 be arranged away from the front end of the second protective cover 13B to the base end side of the gas sensor 1 to form space between the front end of the first protective cover 13A and the front end of the second protective cover 13B. In this structure, after flowing from the cover inlet holes 132 in the outer periphery of the second protective cover 13B into the space between the front end of the first protective cover 13A and the front end of the second protective cover 13B, the measurement gas G enters the cover inlet holes 131 in the outer periphery of the first protective cover 13A. The measurement gas G, as having entered the first protective cover 13A through the cover inlet holes 131 and flowing inside the inner periphery of the first protective cover 13A, then contacts the front end portion 100 of the sensing device 10.

The assembly of the protective covers 13A and 13B may be designed to have a single wall structure.

The gas sensor 1 is engineered to measure the temperature of the sensing device 10. Specifically, the gas sensor 1 is designed to measure an impedance between the pump electrode 21 and the reference electrode 25 through the solid electrolyte body 2 in the pump cell 41 and control the amount of heat to be produced by the heater 5 so as to bring the impedance into agreement with a given value. The pump electrode 21 is heated up to a temperature ranging between 830 and 920° C. in which oxygen is discomposed, while NOx is not discomposed. The sensor electrode 23 is heated up to a temperature ranging between 650 and 740° C. in which the NOx is discomposed, while water is not discomposed.

The insulator 12, as illustrated in FIG. 1, secures the sensing device 10 to the first housing 11A and electrically isolates the sensing device 10 from the first housing 11A. The front end surface 121 of the insulator 12 is located closer to the base end of the gas sensor 1 than the front end surface 111 of the first housing 11A is. The base end edge 231 of the sensor electrode 23 in the lengthwise direction L and the base end edge 221 of the monitor electrode 22 in the lengthwise direction L are, as illustrated in FIG. 4, located closer to the base end of the gas sensor 1 than the front end surface 111 of the first housing 11A is and arranged inside the recess 14 defined by the first end surface 121 of the insulator 12 and the inner peripheral surface 112 of the first housing 11A. The sensor electrode 23 and the monitor electrode 22 has the centers 232 and 222 in the lengthwise direction L which are located closer to the base end side of the gas sensor 1 than the first end surface 111 of the first housing 11A is.

The gas sensor 1 is designed to have the front end portion 100 of the sensing device 10 in which the pump electrode 21, the sensor electrode 23, the monitor electrode 22, and the reference electrode 25 are disposed and which is located as closer to the base end side of the gas sensor 1 as possible relative to the first housing 11A.

When the gas sensor 1 measures the concentration of NOx in the measurement gas G, the measurement gas G is delivered into the protective covers 13A and 13B through the cover inlet holes 131 and 132 and then contacts the front end portion 100 of the sensing device 10. The measurement gas G then flows into the measurement gas space 101 through the inlet hole 331 formed in the front end 103 of the sensing device 10.

The flow of the measurement gas G delivered into the protective covers 13A and 13B is slowed in the recess 14 formed by the front end surface 121 of the insulator 12 and the inner peripheral surface 112 of the first housing 11A. The centers 232 and 222 of the sensor electrode 23 and the monitor electrode 22 in the lengthwise direction L are located closer to the base end side of the gas sensor 1 than the front end surface 111 of the first housing 11A is and at least partially disposed within the recess 14. This minimizes a probability that the measurement gas G impacts a region including a portion of the sensing device 10 in which the sensor electrode 23 and the monitor electrode 22 are disposed or decreases the flow velocity of the measurement gas G which impacts a region including the portion of the sensing device 10 in which the sensor electrode 23 and the monitor electrode 22 are disposed, thereby decreasing a variation in temperature of the sensor electrode 23 and the monitor electrode 22 in response to a change in temperature of the measurement gas G.

Accordingly, the gas sensor 1 has a decreased variation in temperature of the sensor electrode 23 to enhance the accuracy in measuring the concentration of NOx.

Figure 5:
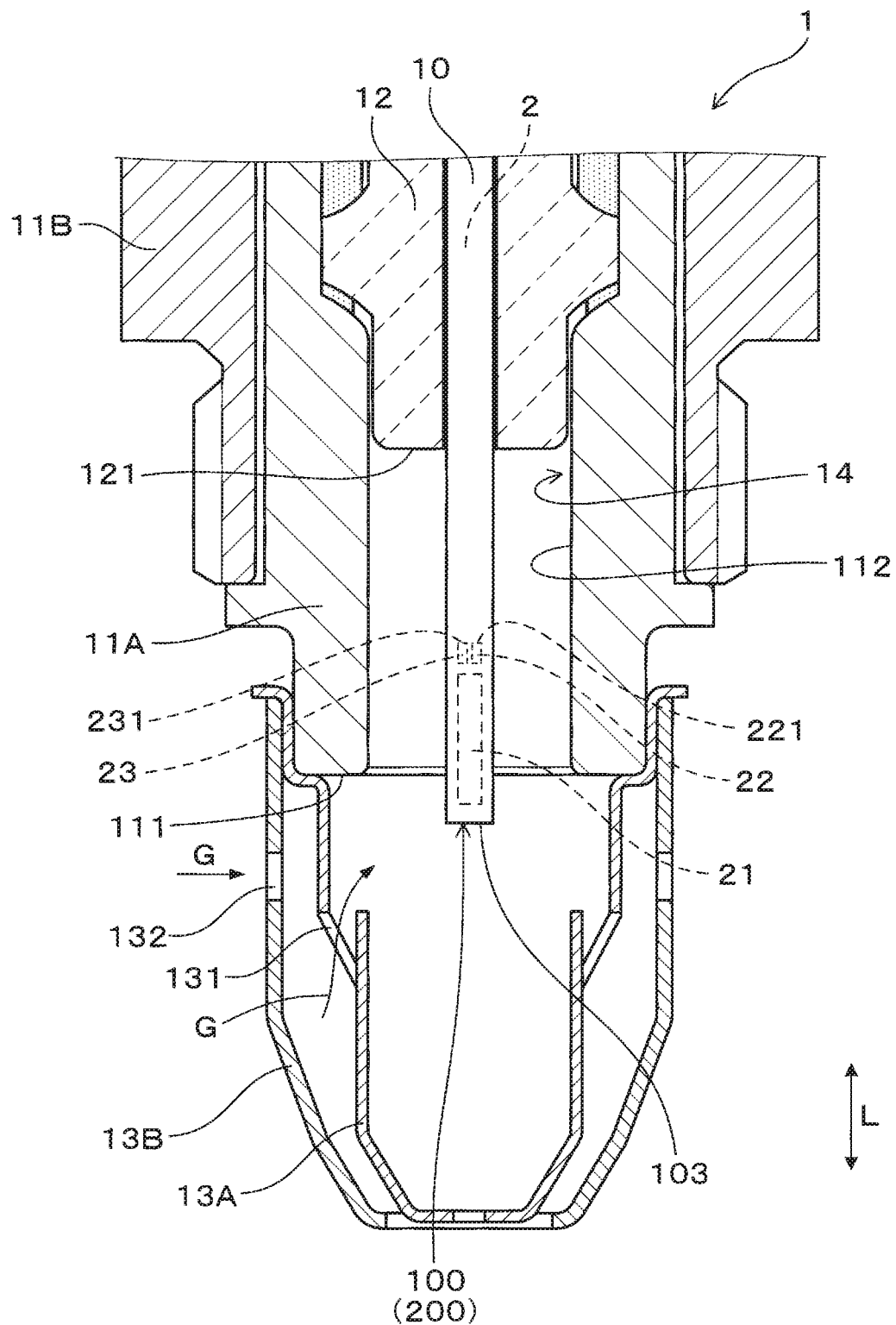
FIG. 5 is an explanatory sectional view which illustrates a front end portion of another type of a gas sensor according to an embodiment.

The gas sensor 1 may be, as illustrated in FIG. 5, designed to have the whole of the sensor electrode 23 located closer to the base end side of the gas sensor 1 than the front end surface 111 of the first housing 11A is. This further decrease a change in temperature of the sensor electrode 23 and the monitor electrode 22.

Figure 6:
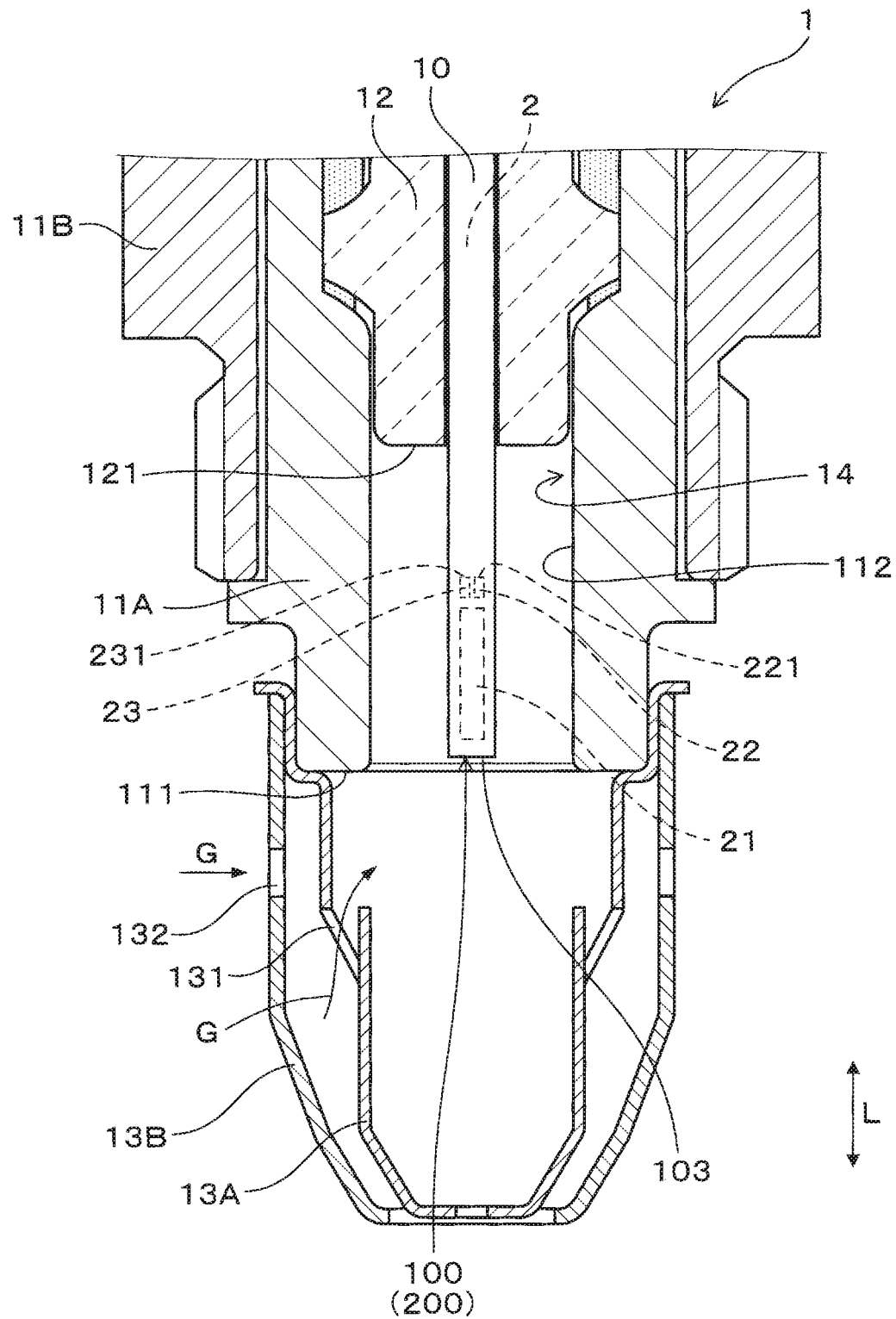
FIG. 6 is an explanatory sectional view which illustrates a front end portion of another type of a gas sensor according to an embodiment.

The gas sensor 1 may be, as illustrated in FIG. 6, designed to have the front end 103 of the sensing device 10 located closer to the base end side of the gas sensor 1 than the front end surface 111 of the first housing 11A is In other words, the whole of the sensing device 10 is disposed inside the recess 14 formed by the front end surface 121 of the insulator 12 and the inner peripheral surface 112 of the first housing 11A. This further decreases a change in temperature of the sensor electrode 23 and the monitor electrode 22.

Verification Tests

Tests were performed to examine a relation between the location of the sensor electrode 23 in the lengthwise direction L and a variation in temperature of the sensor electrode 23. Such temperature variation was measured by simulations on a test sample 1 using a test sample 1 using the protective covers 13A and 13B of FIG. 1 and a test sample 2 using the protective covers 13A and 13B illustrated in FIG. 7. The simulations were performed in a condition where the measurement gas G flows into the gas sensor 1 at 20 m/s from a direction in which the measurement gas G moves in the exhaust pipe in which the gas sensor 1 is installed, that is, a direction perpendicular to the lengthwise direction L of the sensing device 10. The flow velocity of the measurement gas G and a change in temperature of the sensor electrode 23 when the measurement gas G enters the protective covers 13A and 13B and then contacts the front end portion 100 of the sensing device 10 were measured. Changes in the flow velocity and the temperature were also derived for different locations of the sensor electrode 23 in the lengthwise direction L.

Figure 8:
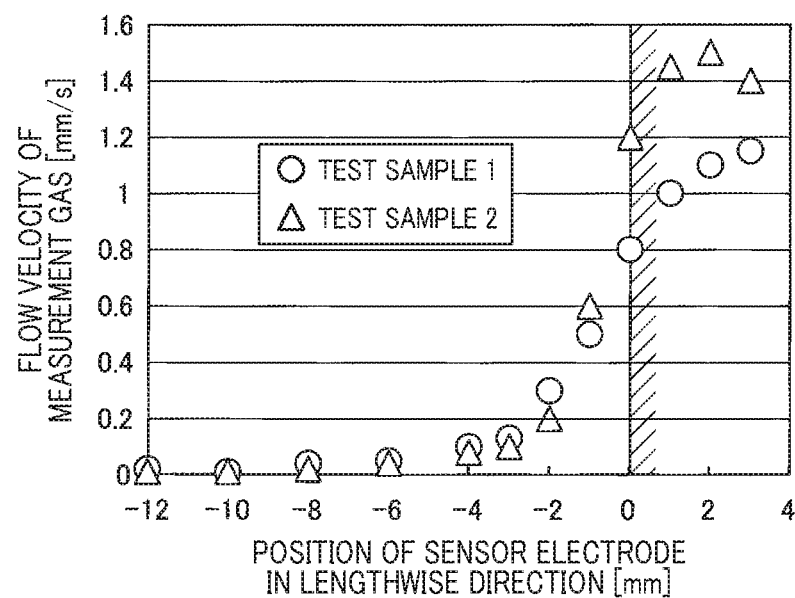
FIG. 8 is a graph which represents a relation between the position of a sensor electrode in a lengthwise direction and the flow velocity of a measurement gas contacting a front end portion of a sensing device in verification tests.

FIG. 8 represents relations between the position of the sensor electrode 23 in the lengthwise direction L and the flow velocity of the measurement gas G when contacts the front end portion 100 of the sensing device 10. When the position of the base end edge 231 of the sensor electrode 23 in the lengthwise direction L is the same as that of the front end surface 111 of the housing 11A, the position of the sensor electrode 23 in the lengthwise direction L is defined as 0 mm. When the position of the base end edge 231 of the sensor electrode 23 in the lengthwise direction L is closer to the base end of the gas sensor 1 than the front end surface 111 of the housing 11A is, the position of the sensor electrode 23 in the lengthwise direction L is defined to have a negative value. When the position of the base end edge 231 of the sensor electrode 23 in the lengthwise direction L is closer to the front end of the gas sensor 1 than the front end surface 111 of the housing 11A is, the position of the sensor electrode 23 in the lengthwise direction L is defined to have a positive value.

FIG. 8 shows that in either of the test samples1 and 2, when the base end edge 231 of the sensor electrode 23 is located closer to the base end of the gas sensor 1 than the front end surface 111 of the housing 11A is in the lengthwise direction L (i.e., the negative value), the flow velocity of the measurement gas G is low and that the farther away from the front end surface 111 of the housing 11A toward the base end of the gas sensor 1 in the lengthwise direction L the base end edge 231 of the sensor electrode 23 is, the lower the flow velocity of the measurement gas G.

Figure 9:
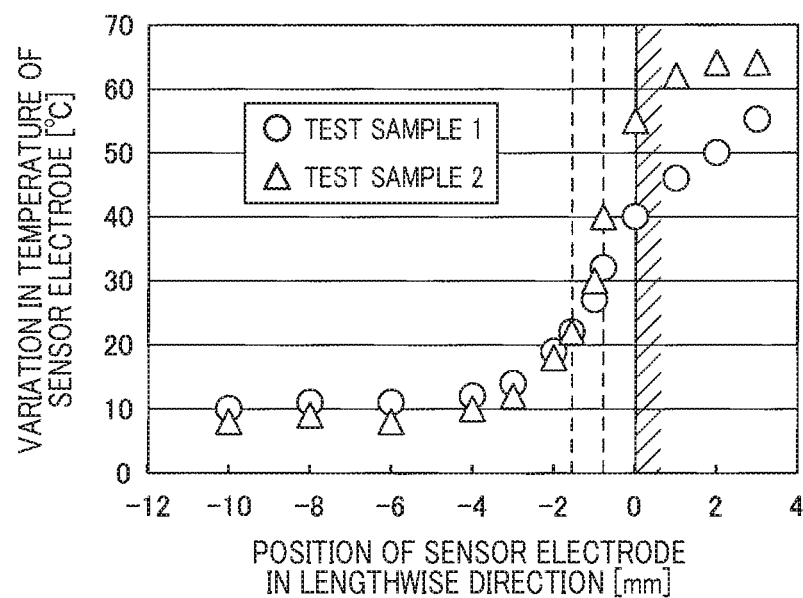
FIG. 9 is a graph which represents a relation between the position of a sensor electrode in a lengthwise direction and a variation in temperature of the sensor electrode in verification tests.

FIG. 9 represents relations between the position of the sensor electrode 23 in the lengthwise direction L and a variation in temperature of the sensor electrode 23. Such a temperature variation is defined as a reference variation when the sensor electrode 23 has a given temperature, and the flow velocity of the measurement gas G is 0 mm/s. FIG. 9 indicates a variation in temperature of the sensor electrode 23 when the flow velocity of the measurement gas G is 20 mm/s from the reference variation when the flow velocity is 0 mm/s. The position of the sensor electrode 23 in the lengthwise direction L is the same in FIG. 8. FIG. 9 shows that in either of the test samples 1 and 2, when the base end edge 231 of the sensor electrode 23 is located closer to the base end of the gas sensor 1 than the front end surface 111 of the housing 11A is in the lengthwise direction L (i.e., the negative value), a variation in temperature of the sensor electrode 23 is low and that the farther away from the front end surface 111 of the housing 11A toward the base end of the gas sensor 1 in the lengthwise direction L the base end edge 231 of the sensor electrode 23 is, the smaller a variation in temperature of the sensor electrode 23.

In FIG. 9, broken lines demonstrate a case where the center 232 of the sensor electrode 23 is located at the same position as that of the front end surface 111 of the housing 11A in the lengthwise direction L (the position of the sensor electrode 23 in the lengthwise direction 1 is −0.8 mm in this embodiment) and a case where the front end of the sensor electrode 23 is located at the same position as that of the front end surface 111 of the housing 11A in the lengthwise direction L (the position of the sensor electrode 23 in the lengthwise direction 1 is −1.6 mm in this embodiment). The test results show that the closer to the base end of the gas sensor 1 the sensor electrode 23 is than the front end surface 111 of the housing 11A is in the lengthwise direction L, the lower a variation in temperature of the sensor electrode 23.

EXPLANATION OF REFERENCE SYMBOLS 1 gas sensor
10 sensing device
11A, 11B housing
12 insulator
13A, 13B protective cover 131, 132 cover inlet hole
2 solid electrolyte body
21 pump electrode
22 monitor electrode
23 sensor electrode
31 base end edge

The invention claimed is:

1. A NOx sensor comprising:
a housing;
an insulator retained by an inner periphery of the housing;
a sensing device which includes a solid electrolyte body which is disposed in the insulator and has oxygen ion conductivity, a front end portion of the sensing device in a lengthwise direction of the NOx sensor protruding from a front end surface of the insulator; and
a protective cover which is secured to a front end portion of the housing so as to cover the front end portion of the sensing device and has formed therein cover inlet holes which direct a measurement gas to the front end portion of the sensing device, wherein
a pump electrode and a sensor electrode are disposed in a front end portion of the solid electrolyte body in the lengthwise direction of the NOx sensor, the pump electrode being exposed to the measurement gas and regulating a concentration of oxygen in the measurement gas, the sensor electrode being exposed to the measurement gas and measuring a concentration of a given gas component in the measurement gas after being regulated in the concentration of oxygen by the pump electrode, and the given gas component whose concentration is measured by the sensor electrode is NOx,
a whole of the sensor electrode is located closer to a base end side of the NOx sensor than all the cover inlet holes formed in an outer periphery of the protective cover are in the lengthwise direction of the NOx sensor,
a base end of the sensor electrode in the lengthwise direction of the NOx sensor is located closer to the base end side of the NOx sensor than a front end surface of the housing is, and
at least a portion of the pump electrode is arranged outside of the housing, and the at least the portion of the pump electrode is located inside the protective cover.

2. The NOx sensor as set forth in claim 1, wherein the whole of the sensor electrode is located closer to the base end side of the NOx sensor than the front end surface of the housing is and arranged inside a recess formed by the front end surface of the insulator and an inner peripheral surface of the housing.

3. The NOx sensor as set forth in claim 1, wherein the sensing device has a measurement gas space which introduces the measurement gas to a surface of the solid electrolyte body, in that the pump electrode and the sensor electrode are exposed to the measurement gas delivered to the measurement gas space, and in that a front end of the sensing device has formed therein an inlet hole which directs the measurement gas into the measurement gas space through a diffusion resistor.

4. The NOx sensor as set forth in claim 1, wherein the whole of the sensor electrode is located closer to the base end side of the NOx sensor than a base end of the protective cover is.

5. The NOx sensor as set forth in claim 1, wherein:
the protective cover includes a first protective cover and a second protective cover, the first protective cover being secured to an outer periphery of the front end portion of the housing, the second protective cover being secured to an outer periphery of the first protective cover, and
the cover inlet holes formed in the outer periphery of the first protective cover are located closer to a front end side of the NOx sensor than the cover inlet holes formed in an outer periphery of the second protective cover are in the lengthwise direction of the NOx sensor.

6. The NOx sensor as set forth in claim 1, wherein:
a front end side of the sensor electrode is located closer to the base end side of the NOx sensor than a base end side of the pump electrode is.

7. The NOx sensor as set forth in claim 1, wherein:
the sensor electrode and the pump electrode are mounted on a same side of the solid electrolyte body.

* * * * *